United States Patent [19]
Lee

[11] 3,981,230
[45] Sept. 21, 1976

[54] APPARATUS FOR THERMALLY MACHINING THERMOPLASTICS SHEET

[75] Inventor: Michael John Lee, Didcot, England

[73] Assignee: A. J. Bingley Limited, Bristol, England

[22] Filed: Sept. 29, 1975

[21] Appl. No.: 617,656

[30] Foreign Application Priority Data
Oct. 3, 1974  United Kingdom............... 43027/74

[52] U.S. Cl............................. 93/33 H; 93/DIG. 1; 156/380; 219/121 LM
[51] Int. Cl.² ....................... B31B 1/16; B31B 1/64
[58] Field of Search ................. 219/121 LM, 121 L; 331/DIG. 1; 156/272, 380, 583, 515; 93/33 H, 33 R, 58 R, 35 R, 8 R, DIG. 1; 53/373, 379, DIG. 2

[56] References Cited
UNITED STATES PATENTS

| | | | |
|---|---|---|---|
| 3,004,881 | 10/1961 | Van der Meulen................ | 93/8 R X |
| 3,247,041 | 4/1966 | Henderson...................... | 156/380 X |
| 3,419,706 | 12/1968 | Lohrmann .................... | 219/121 LM |
| 3,626,143 | 12/1971 | Fry.............................. | 219/121 LM |
| 3,838,631 | 10/1974 | Simpson et al.................. | 93/8 R X |
| 3,909,582 | 9/1975 | Bowen ......................... | 219/121 LM |

*Primary Examiner*—James F. Coan
*Attorney, Agent, or Firm*—Larson, Taylor and Hinds

[57] ABSTRACT

An apparatus for thermally machining thermoplastics sheet, i.e. cutting and/or welding the sheet, uses a laser. The sheet is tensioned over a backing member of a suitable refractory material such as fused silica. The laser beam is focussed on the sheet over the backing member and the laser energy passing through the sheet is absorbed in the surface layers of the backing member which is highly absorbing at the laser output wavelength. The material of the backing material also has a low thermal diffusivity so that a hot spot is formed at the point where the focussed laser beam is incident. Because the sheet is held in intimate contact with the backing member, heat from the hot spot passed back into the sheet to aid machining.

8 Claims, 11 Drawing Figures

APPARATUS FOR THERMALLY MACHINING THERMOPLASTICS SHEET

The present invention relates to apparatus for thermally machining thermoplastics sheet and is particularly concerned with the cutting and welding of, for example, polythene sheet by means of lasers.

Such machining operations are applied when, for instance, manufacturing plastics bags from strips of plastics sheet material and there are numerous machines known in the art for manufacturing such bags. Such prior art machines typically employ a hot member, such as a hot wire or knife, which is applied to the plastics sheet material to cut and/or weld the sheet material. The prior art machines tend to have problems resulting from their complicated mechanical structure required to apply and retract the hot members to and from the plastics sheet. It is clearly desirable that bag forming machines should operate at as high a speed possible and speeds of operation are generally restricted with prior art machines by the complicated mechanical structure and the difficulty of putting sufficient heat energy into the plastics material where it is to be welded or cut in the shortest possible time.

A useful tool for transmitting high energy densities into materials is a laser. The most commonly used high power laser, at the present time, is the carbon dioxide laser which emits radiation at a wavelength of 10.6 microns. Unfortunately the use of a carbon dioxide laser for cutting and/or welding thermoplastics sheets has not shown clear advantages because most thermoplastics materials do not have high levels of absorption of radiation at such a wavelength. Thus, if the radiation from a carbon dioxide laser is directed at, for instance thin polythene sheet, most of the laser energy passes straight through the sheet causing relatively little heating and the efficiency of energy usage is low.

According to the present invention, apparatus for thermally machining thermoplastics sheet with a laser comprises at least one backing member of a material having a high coefficient of absorption of radiant energy at the wavelength emitted by the laser, a low thermal diffusivity and good resistance to thermal shock, means for tensioning the thermoplastics sheet over the backing member so that it is maintained in intimate thermal contact with the backing member where it is deflected thereby, means for focussing radiation from the laser onto the sheet where it lies over the backing member and means for scanning the focussed laser radiation over the sheet.

When the material for the backing member is described as having a high coefficient of absorption in the above, it is meant that the absorbtivity of the material at the laser wavelength is sufficiently high that substantially all the radiant energy from the laser passing through the thermoplastics sheet and incident on the backing member is absorbed in the surface layers of the material of the member without penetrating further than, say, two millimeters into the material. Thus, as the laser radiation is scanned over the thermoplastics sheet, energy passing through the sheet is absorbed in the backing member to heat the member. By the material having a low thermal diffusivity, it is meant that the diffusivity is sufficiently low that the absorption of laser energy by the backing member produces a hot spot on the surface of the member substantially corresponding, at any moment, to the area being irradiated by the focussed laser energy. The resistance of the material of the backing member to thermal shock must be sufficiently good that the material does not decompose or fracture when exposed to the extreme localised heating employed by the foregoing.

Since the sheet is held in intimate thermal contact with a backing member the hot spot aids in the machining of the sheet. The laser energy which is transmitted right through the sheet is absorbed to form the hot spot on the backing member and is, in effect, redirected back into the sheet. Thus, the utilization of the laser energy is enhanced.

Although the mechanism involved in redirecting the laser energy is not yet fully understood, it is thought to include either direct conductive heat transfer from the backing member into the sheet or re-radiation of energy from the member at a shorter wavelength which is more readily absorbed in the sheet material, or to be a mixture of these two processes. In any case it has been found essential for increasing machining efficiency to ensure a firm intimate thermal contact between the sheet and the backing member.

It is envisaged that the machining performed by the apparatus of the present invention is either the cutting through of the sheet of thermoplastics material, or the welding together of two or more superimposed layers of thermoplastics sheet, or a combination of the above whereby superimposed layers of sheet are cut through and simultaneously, welded together along their cut edges. In order to perform the desired machining operation, the energy density applied to the thermoplastics sheet by the apparatus is controlled. This applied energy density depends chiefly on the power output of the laser being used, the efficiency of the backing member in redirecting energy into the thermoplastics sheet, the absorbtivity of the thermoplastics sheet at the wavelength of the laser output, the size of the focussed area of laser energy applied to the sheet and the speed of scan of the laser radiation across the sheet.

In practice, the redirecting efficiency of the backing member is maximised so as to utilisze the laser energy at maximum efficiency and, for this purpose, the backing member is preferably formed of the silicious material, such as quartz or fused silica, which are found to combine the requirements for the backing member material discussed above. In order to provide high speed machining, implying high rates of scan of the laser radiation across the sheet, a high power output laser should be used and, preferably, a carbon dioxide laser is chosen having a power output of at least 400 watts. It is not normally practicable to control the power output of a laser and it is clearly undesirable to control the energy of the radiation applied to the thermoplastic sheet by diverting part of the radiation emitted by the laser and wasting it. Thus, the energy density applied to the thermoplastic sheet is usually controlled in practice by adjusting the scanning rate of the radiation across the sheet.

It will be understood that although the present invention has been stimulated by the problems associated with using a carbon dioxide laser for machining thermoplastics sheet, since this is the only form of laser conveniently available at the present time with the necessary power output, the apparatus of the present invention may be used with other forms of laser having the necessary power output and similar problems with regard to the wavelength of their output not being absorbed by the thermoplastics material.

Preferably, the means for focussing the laser beam bring the laser radiation to a line focus on the sheet with the axis of the line oriented in the direction in which the radiation is scanned over the sheet by the means for scannig. Also, preferably the tensioning means is adjustable to enable the tension applied to the sheet to be varied to suit the type and thickness of thermoplastics material to be machined and also the machining operation to be performed.

In order to weld together two layers of thermoplastics sheet, the energy density applied to the two sheets should be sufficient only to soften the sheets for a sufficient time to allow the softened thermoplastics material to flow together. However, for cutting thermoplastic sheet, the energy density should be higher, for the same material, so that the plastics material is vaporized along the line of cut. For cutting and welding simultaneously, i.e. in operations manufacturing plastic bags, it is necessary to achieve both the above conditions at the same time. This can be done with the line focussed laser beam, in which the energy density across the line has an approximately Gaussian profile, so that the energy density applied to the material along the central axis of the line is sufficient to vaporize the plastics material whereas the density along either side of the line is only sufficient to soften and, therefore, weld the material.

In a preferred application, the apparatus of the present invention is adapted for manufacturing bags from a strip of two superimposed layers of the thermoplastics sheet and comprises a carriage, a plurality of dividing members thereon to define a series of spatial intervals, means for continuously feeding the strip of thermoplastics sheet material to the carriage, and means for moving the carriage to present each spatial intervals successively to the means for feeding so that the strip of material is fed into each spatial interval and over the edges of the adjacent dividing members, wherein the edges of at least some of the dividing members are formed of said backing member material and constitute a plurality of said backing members. Then, the means for tensioning the sheet may comprise means for extracting air from the spatial intervals so as to pull the strip into spatial intervals and produce tension in the strip where it extends around the edges of the dividing members.

Examples of the invention will now be described with reference to the accompanying drawings in which.

Figure 1:
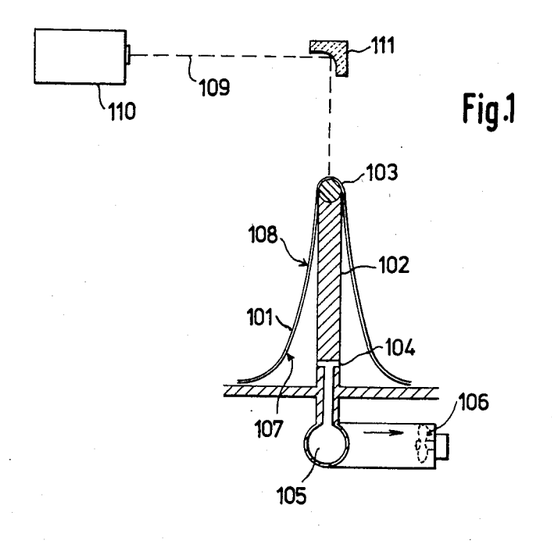
FIG. 1 is a semi-diagrammatic illustration of a part of a machine embodying the present invention.

Referring to FIG. 1, a portion of thermoplastics sheet 101 is shown draped across a supporting plate 102. The plate 102 is capped along one edge by a rod 103 which is made of fused silica. The rod 103 acts as a backing member for the sheet 101. The plate 102 has holes 104 drilled in it which communicate with a manifold 105 and a fan 106. Operation of the fan 106 creates a pressure differential across the inner and outer surfaces 107, 108 respectively, of the sheet 101 tending to suck the sheet downwardly on either side of the rod 103, thereby creating tension in the sheet 101 and ensuring intimate thermal contact between the sheet and the rod 103. The positions of the holes 104 in the plate 102 are such that the suction forces which maintain the tension in the sheet 101 are unaffected by whether or not the sheet 101 is continuous along the rod 103. Hence, the tension in the sheet 101 is unaffected as operations to cut the sheet along the rod 103 are carried out.

A beam 109 of radiation from a carbon dioxide laser 110 passes through a focussing system 111 which brings the beam 109 to an approximate line or elliptic focus with an aspect ratio of approximately 10:1. The optical system 111 further includes a scanning arrangement which causes the beam 109 to traverse the sheet 101 along the top of the rod 103. The major axis of the focus of the beam is oriented in the direction of scan of the beam across the sheet. The focus of the beam 109 as it is scanned across the sheet 101 is maintained by established optical techniques which are well known to those skilled in the art and are not described herein. The laser preferably has a continuous output of about 500 watts and is focussed so that the radiated area on the sheet 101 is an ellipse having a major axis of approximately 20 millimeters and a minor axis of approximately 2 millimeters.

The wavelength of the laser output is 10.6 microns. The amount of radiation absorbed by the thermoplastics sheet depends on the type of thermoplastics material used. However, for polythene most of the energy will pass through the sheet and is absorbed by the backing rod 103. The fused silica material of the backing rod has a high absorbtivity to radiation at 10.6 microns and also has a relatively low diffusivity so that the laser energy incident on the surface of the rod forms a hot spot on the rod substantially corresponding at any time to the area being radiated. The thermal energy of the hot spot is directed back into the sheet 101 to facilitate the machining of the sheet.

The sheet 101 may comprise two superimposed strips of polythene and this embodiment of the invention may be used to weld the two sheets together and cut through the sheets along the centre of the welded seam. With polythene sheet of some 15 microns thickness, effective welding and cutting can be achieved with scanning speeds of 1000 feet per second. At such speeds the hot spot produced on the backing rod 103 achieves a temperature of approximately 1900°C at which it emits radiation in the spectral range from 1.7 to 3.4 microns which is absorbed sufficiently by the polythene of the sheet 101. Also heat is directly applied to the polythene sheet by conduction from the surface of the backing material.

If the embodiment of the invention is only to weld together the two sheets, then it is desirable to provide pressurised gas between the sheet 101 and the surface of the rod 103. This can be provided by the gas produced from the material of the backing rod or the sheet 101 as the result of the high temperatures produced. Alternatively it may be created by injecting gaseous medium through perforations in the backing rod.

The degree of tension in the sheet 101 should be sufficient to ensure positive thermal contact with the surface of the rod 103. In practice it has been found satisfactory if the tension is greater than 400 grams per meter across the width of the sheet and the angle of wrap of the sheet around the rod 103 is about 120°.

The backing rods 103 may be formed as tubes of fused silica in which case they have the advantage that a resistance wire can be provided extending along the tubes to enable the tubes to be preheated.

Figures 2, 3, 4:
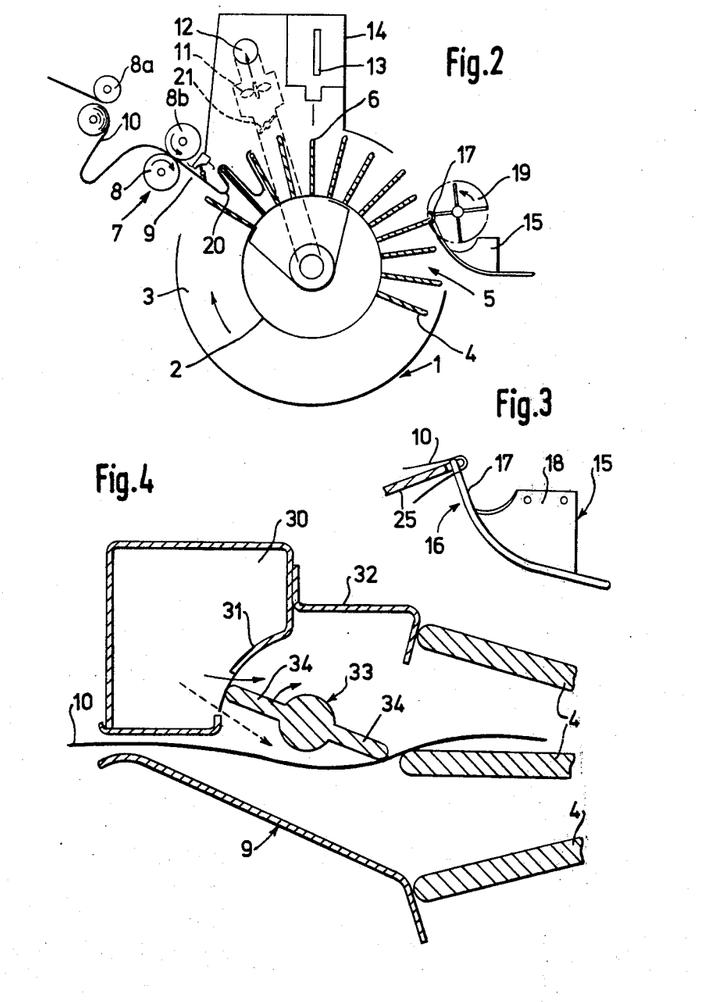
FIG. 2 is a diagrammatic representation of an apparatus for making plastics bags from superimposed strips of thermoplastics material and embodying the present invention.
FIG. 3 is a view of a take-off device incorporated in the apparatus of FIG. 2.
FIG. 4 illustrates in more detail a material feed device incorporated in the apparatus of FIG. 2.

Referring now to FIG. 2, there is shown a machine for making bags from tubular strips of thermoplastics material incorporating the features of the embodiment of the invention described above. A drum 1, formed by a cylindrical hub 2 and two end plates 3, of which only one is shown, has a plurality of dividing members 4 which form a series of spatial intervals, or pockets 5 spaced around the periphery of the hub 2. The dividing members 4 are in the form of radially mounted plates, alternate plates being longer or shorter in the radial sense. The outer edges of the longer of the dividing members 4 have a number of indentations formed in them, while the shorter of the dividing members 4 are capped with a suitable refractory material 6 and constitute backing members. The caps 6 may be provided by rods of fused silica as described with reference to FIG. 1. The drum 1, is rotated by an electric motor which is not shown. A feed station, indicated generally by the numeral 7, includes two pairs of driven feed rollers 8a and 8b and a guide duct 9 described in detail later. The rollers 8a and 8b are driven by electric motors, which also are not shown, and which are linked to a servo control system, to be described later, which operates also upon the motor driving the drum 1 in such a manner that a predetermined, but variable relationship can be maintained between the speed of rotation of the drum 1 and the rate of feed of a web 10 of tubular strip plastics material, to be made into bags. The rollers 8a pull the web 10 of feed stock material from a supply drum, which is not shown, and the rollers 8b feed the web 10 to the drum 1 via a guide duct 9. The strip plastics material is a flattened tube of high-density polythene. The hub of the drum 1 is perforated and a fan 11 and an associated system of ducting 12 enable an inwardly directed air pressure gradient to be maintained. Further round in the direction of rotation of the drum 1 is a laser 13 the beam from which is arranged to be tracked across the ends of the dividing members 4. The beam from the laser 13 is arranged to have a power cross-section such that in cooperation with the fused silica caps 6, welding and cutting operations are performed simultaneously.

Further round still is a take off device 15 for removing bags which have been completed. The take-off device 15 is illustrated in FIGS. 2 and 3. Referring to these figures, the take-off device 15 consists of a number of curved spikes 16 which are made from pointed strips 17 of steel and are so positioned as to pass through the indentations the longer dividing members 4, previously referred to. The strips 17 have webs 18 attached to them which enable them to be attached to the rest of the apparatus. The sides of the strips 17 are sharpened in the neighbourhood of their points, and the leading edges of the webs 18 also are sharpened. Bags carried round to the take-off point are forced onto the spikes 16, and the sharpened edges cut T-shaped slots in the bag material so that the picked-off bags can travel down the spikes 16. The polythene is sufficiently rigid for the bags to stay on the spikes 16. The action of the spikes 16 is facilitated by a rotating paddle 19 driven through gearing from the drive of the drum 1.

The action of the apparatus is as follows:

As each pocket 5 is presented to the feed station 7, a length of the web 10 is fed into it and forms a loop 20. The size of the loop 20, and hence that of the finished bag, is determined by the rate of feed of the web 10 in relation to the angular velocity of the drum 1. The formation of each loop 20 is assisted by means of the inward pressure gradient generated by the fan 11 and the ducting 12. The force exerted on the web 10 is greatest when it has just entered any given pocket 5 and decreases as the pocket 5 is filled. On the other hand the frictional force between the strip 10 and the leading face of the trailing dividing member 4 which forms the pocket 5 increases as the loop 20 is formed. The formation and control of the length of the loop can be aided by means of a throttle valve 21 in the ducting 12. The differential pressure also keeps the loops 20 in position as they are carried round to the position of the laser 13 which welds and cuts the web 10. The laser 13 is operated when the shorter dividing members 4 are positioned beneath its beam position.

Figure 6:
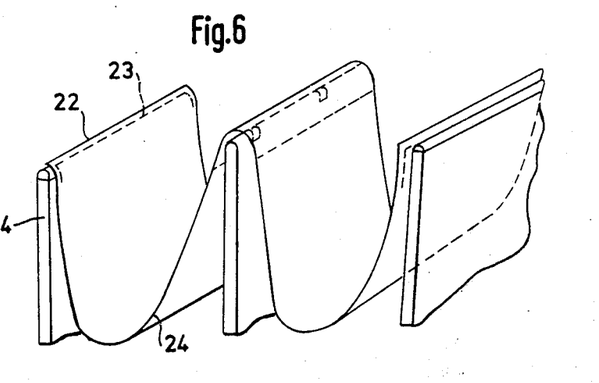
FIG. 6 illustrates how pairs of bags can be formed from a tubular strip of plastics material.

The manner in which two bags can be produced simultaneously is illustrated in FIG. 6. Cross-cuts 22 and weld seals 23 are formed on successive shorter dividing members 4 leaving a sealed length 24 of the web 10 folded across the intermediate longer dividing member 4, upon which it is carried round to the position of the take-off spikes 16. These are forced into the folded region of the sealed length 24 of the web 10, and the sealed lengths of the web 10 are picked off with the welded ends all together. When sufficient sealed lengths 24 have been collected they are removed, tack-welded together and provided with perforations near the folds to enable separate bags to be torn off.

Figure 7:
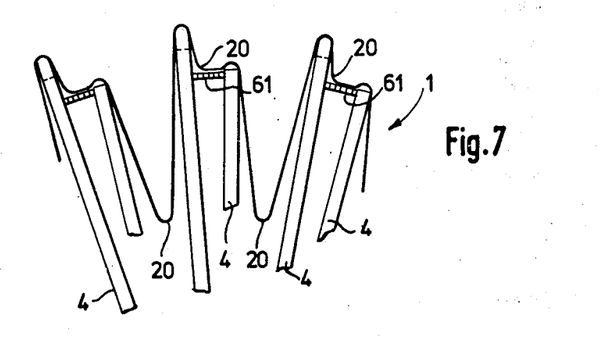
FIG. 7 illustrates how single bags can be formed from the strip.

Single bags can be made by so displacing the intermediate members 4 with relation to the adjacent dividing members 4 that alternate pockets 5 are wide and narrow, as shown in FIG. 7. The constant rate of feed of the web 10 will result in long loops 20 being formed in the wide pockets 5 and only short loops being formed in the narrow pockets 5, again as shown in FIG. 6. After the sealing and cutting of the lengths 24 of the web 10, they are removed by the take-off spikes 15 as before, and the unwanted material is cut off.

It may be advantageous to provide a perforated plate 61 near the outer end of each narrow pocket 5. The inward flow of air will press the web 10 against the plates even when the web 10 has been cut into sealed lengths 24 and so will help to prevent any tendency for the separated lengths to slip on the intermediate members 4 due to the different weights of material on each side of the intermediate members 4 before they are taken off by the spikes 15.

To achieve high rates of production it is necessary to positively direct the web 10 into successive pockets 5 instead of relying solely on the passage of the dividing members past the feed station 7.

Referring to FIG. 4, the feed duct 9 includes a device for positively directing the web 10 into successive pockets 5 and its action is illustrated in FIGS. 5a to 5d. Attached to one side wall of the duct 9 is a plenum chamber 30. The passage of air from the plenum chamber 30 is controlled by a valve plate 31 and an adjustable gate 32, which forms part of the duct 9. Positioned in the path of air issuing through the valve plate 31 is a twin-lobed rotor 33 which is arranged to be driven at a rate of N/2P where N is the rate of rotation of the drum 1 and P is the number of pockets 5 in the drum 1. The radial length of the blades or lobes 34 of the rotor 33 is such as to provide a slight overlap between their tips and the larger dividing members 4.

The drives between the drum 1 and the rotor 33 are so arranged that the lobes 34 and the dividing members 4 pass one another approximately simultaneously but without actually making contact.

Figure 5A:
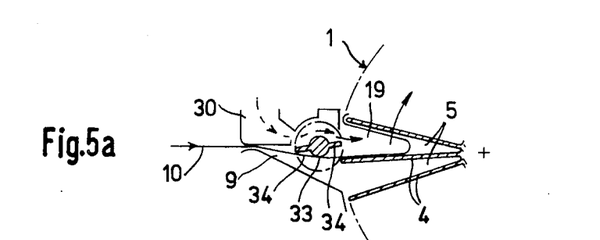
FIGS. 5a to d illustrate the action of the material feed device shown in FIG. 4.
Figure 5B:
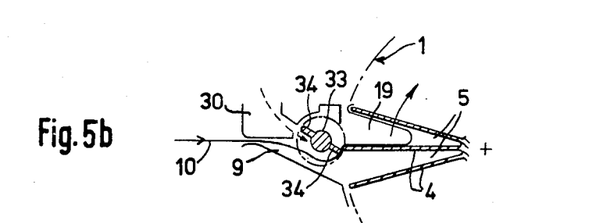
Figure 5C:
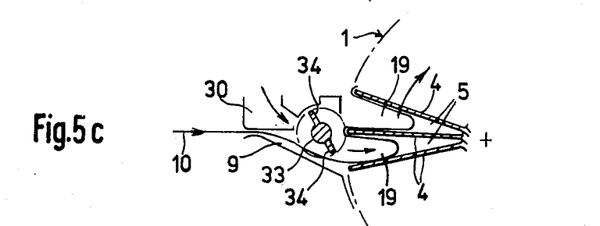
Figure 5D:
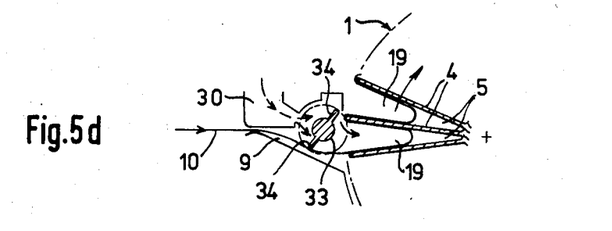

In FIG. 5a the rotor 33 is shown with its lobes 34 approximately parallel to the direction of feed of the feed stock material 10. Air is able to pass from the plenum chamber 30 along one side of the rotor 33 so as to assist in the formation of a loop 20 of material in one particular pocket 5. FIG. 5b shows the situation when a particular dividing member 4 has just passed a corresponding lobe 34. The slight overlap of the lobe 34 and the dividing member 4 has enabled the lobe 34 to carry the web 10 over the tip of the dividing member 4 and somewhat into the next pocket 5 to assist in the formation of a loop 20. Also, just prior to the mechanical deflection of the web 10 the movement of the rotor 33 cut off the passage of air to the previous pocket 5 and directed it towards the succeeding pocket 5 to assist in forming the incipient loop 20. FIG. 5c shows the situation somewhat later when the loop 20 is partly formed, and FIG. 5d shows the situation later still. Air can now pass on both sides of the rotor 33 into the forming loop 20. And so on.

Alternatively, the web 10 of material can be directed into the pockets 5 by means of suitably positioned and activated jets of air.

Commonly, a carbon dioxide laser is used, and the feedstock material is polythene. The absorption of energy by the polythene is increased because the fused silica for the tips 6 absorbs readily the 10.6 radiation from the laser, heats up and passes thermal energy back into the polythene.

The laser 13 can be moved physically, but it is preferable to keep the laser 13 stationary and cause the beam of radiation from it to move across the feed stock material 10 by optical means. In either case, due to the motion of the drum 1 it is necessary for the laser beam to have a component of velocity along the length of the strip 10 equal to the linear velocity of the appropriate dividing member 4.

Figure 8:
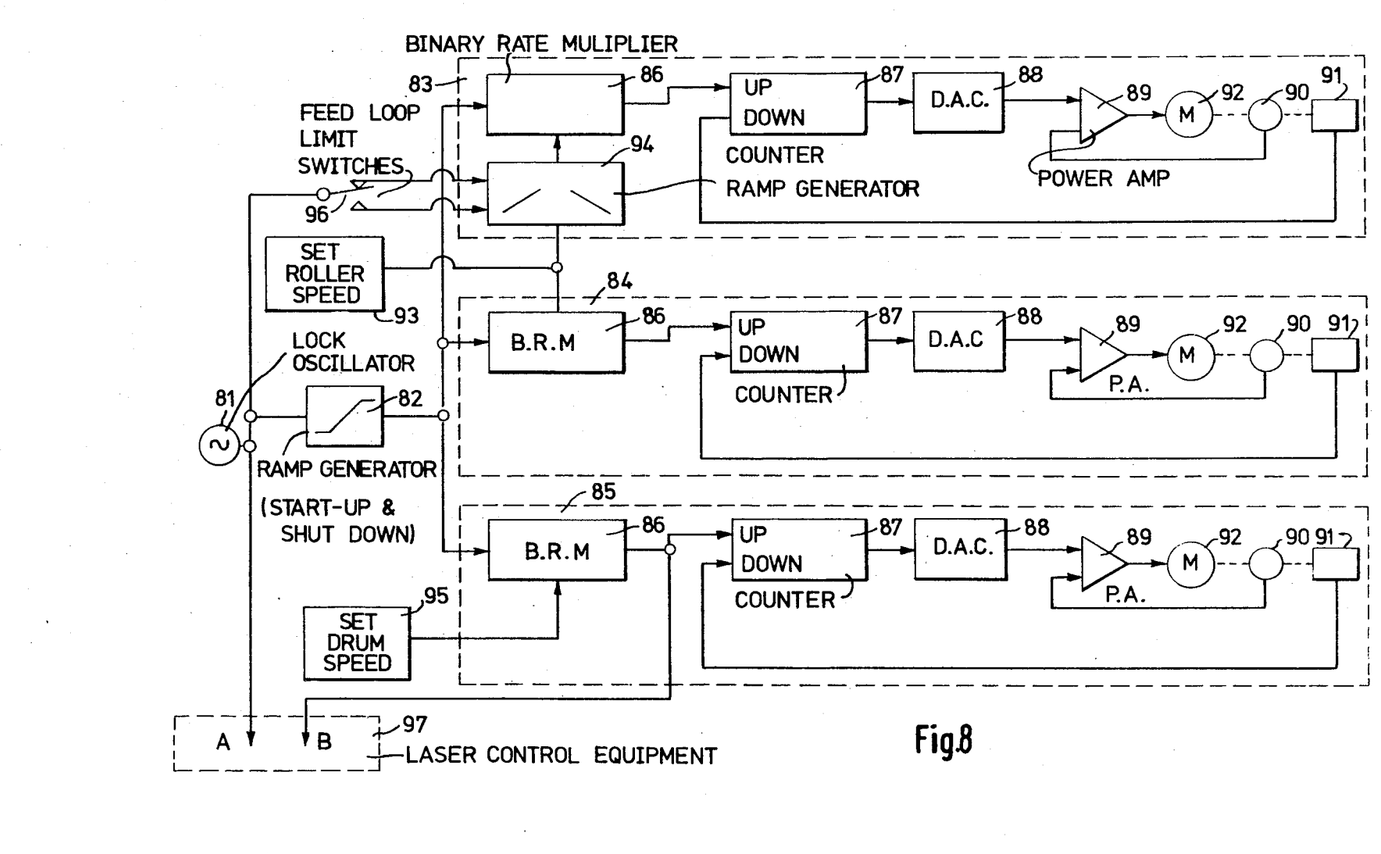
FIG. 8 is a block circuit diagram of a servo control system which may be incorporated in the apparatus of FIG. 2.

Referring to FIG. 8, the servo control system which maintains the desired relationship between the rotational speed of the drum 1 and the rate of feed of the web 10 consists of a clock pulse generator 81, a ramp generator 82 and three control loops indicated generally by the reference numerals 83, 84 and 85. The loops 83 and 84 control the drives to the feed rollers 8a and 8b and the loop 85 controls the drive to the drum 1. Each of the control loops 83, 84 and 85 include a binary rate multiplier 86, a counter 87, an digital-to-analogue converter 88, a power amplifier 89 a tachometer 90, and a shaft position encoder 91. The tachometer 90 and the shaft position encoder 91 are attached to the armature of an electric motor 92 which drives the relevant part of the machine. The control loop 83 which controls the unreel roller 8a, also includes a ramp generator 94. The two loops 83 and 84 are governed by a set speed device 93 for setting the speed of the rollers 8a and 8b in relation to that of the drum 1. The loop 85 is governed by another set speed device 95 for setting the speed of the drum 1.

The system operates as follows: The clock pulse generator 81 produces a sequence of regularly recurring clock pulses. The clock pulses are applied to the ramp generator 82, which varies their apparent frequency during periods of run-up and run-down of the machine to and from its working rate, and thence to the binary rate multiplier 86 of each of the control loops 83, 84 and 85.

In the case of the control loop 83, the clock pulses are applied to the rate multiplier 86 via the ramp generator 94.

The factors by which the clock pulses are multiplied are governed by the set speed devices 93 and 95 under the control of the operator of the machine. It is the relationship between these factors which determines the relationship between the rate of feed of the web 10 and the rate of rotation of the drum 1, and hence the size of the finished bags. In each of the control loops 83, 84 and 85, the pulses from the multiplier 86 are applied to the counter 87 and there compared with pulses derived from the shaft position encoder 91. The resulting difference signal is applied to the digital-to-analogue converter 88 and thence to the power amplifier 89 which drives the motor 92. Further control over the shaft speed of each motor 92 is derived from a tachometer 90 attached to the armature of the motor 92 which produces signals indicative of the shaft speed. The velocity signals also are applied to the amplifier 89.

The clock pulses from the pulse generator 81 also are applied to a separate control system 97 for controlling the operation of the laser 13, and, via two limit switches 96 to the ramp generator 94 which is included in the control loop 83. The purpose of this arrangement is to ensure that a loop of lightly tensioned web material is maintained between the rollers 8a and 8b, thus ensuring that the web 10 is fed to the drum 1 in an unstressed state. The limit switches 96 enable the size of the loop to be controlled.

I claim:

1. Apparatus for thermally machining thermoplastics sheet with a laser, comprising at least one backing member of a material having a high coefficient of absorption of radiant energy at the wavelength emitted by the laser, a low thermal diffusivity and good resistance to thermal shock, means for tensioning the thermoplastics sheet over the backing member so that it is maintained in intimate thermal contact with the backing member where it is deflected thereby, means for focussing radiation from the laser on to the sheet where it lies over the backing member and means for scanning the focussed laser radiation over the sheet.

2. Apparatus as claimed in claim 1 and for manufacturing bags from a strip of two superimposed layers of the thermoplastics sheet, comprising a carriage, a plurality of dividing members thereon to define a series of spatial intervals, means for continuously feeding the strip of thermoplastics sheet material to the carriage, and means for moving the carriage to present each spatial interval successively to the means for feeding so that the strip of material is fed into each spatial interval and over the edges of the adjacent dividing members wherein the edges of at least some of the dividing members are formed of said backing member material and constitute a plurality of said backing members.

3. Apparatus as claimed in claim 2 wherein the means for tensioning comprises means for extracting air from the spatial intervals so as to pull the strip into the spatial intervals and produces tension in the strip where it extends around the edges of the dividing members.

4. Apparatus as claimed in claim 1 wherein the laser is a $CO_2$ laser having an output of at least 400 Watts.

5. Apparatus as claimed in claim 1 wherein the means for focussing bring the laser radiation to a line focus on the sheet with the axis of the line oriented in the direction in which the radiation is scanned over the sheet by the means for scanning.

6. Apparatus as claimed in claim 1 wherein the backing member is formed of a siliceous material.

7. Apparatus as claimed in claim 6 wherein the backing member of formed of quartz.

8. Apparatus as claimed in claim 6 wherein the backing member is formed of fused silica.

* * * * *